(12) United States Patent
Yamamoto et al.

(10) Patent No.: US 11,542,951 B2
(45) Date of Patent: Jan. 3, 2023

(54) GAS COMPRESSOR AND CONTROL METHOD THEREFOR

(71) Applicant: Hitachi Industrial Equipment Systems Co., Ltd., Tokyo (JP)

(72) Inventors: Akihiro Yamamoto, Tokyo (JP); Yoshiyuki Kanemoto, Tokyo (JP); Norio Aoyagi, Tokyo (JP); Hiroaki Saito, Tokyo (JP); Fuminori Kato, Tokyo (JP); Daichi Oka, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 16/978,506

(22) PCT Filed: Jul. 26, 2019

(86) PCT No.: PCT/JP2019/029511
§ 371 (c)(1),
(2) Date: Sep. 4, 2020

(87) PCT Pub. No.: WO2020/066268
PCT Pub. Date: Apr. 2, 2020

(65) Prior Publication Data
US 2020/0400154 A1 Dec. 24, 2020

(30) Foreign Application Priority Data
Sep. 27, 2018 (JP) .............................. JP2018-181425

(51) Int. Cl.
*F04D 27/00* (2006.01)
*F04D 25/06* (2006.01)
*F04D 17/10* (2006.01)

(52) U.S. Cl.
CPC ........... *F04D 27/005* (2013.01); *F04D 17/10* (2013.01); *F04D 25/06* (2013.01)

(58) Field of Classification Search
CPC ......... F04D 17/10; F04D 25/06; F04D 27/005
See application file for complete search history.

(56) References Cited

FOREIGN PATENT DOCUMENTS

| JP | 2-11878 A | 1/1990 |
|---|---|---|
| JP | H02211878 A | * 1/1990 |

(Continued)

OTHER PUBLICATIONS

English Translation of JP-2014152698-A obtained Nov. 3, 2021 (Year: 2021).*

(Continued)

*Primary Examiner* — Connor J Tremarche
(74) *Attorney, Agent, or Firm* — Crowell & Moring LLP

(57) ABSTRACT

The purpose of the present invention is to provide a gas compressor capable of reducing variation in discharge pressure through control of the number of compressor bodies and a control method for the gas compressor. In order to solve the problem, this gas compressor includes a plurality of compressor units each having a compressor body, a motor for driving the compressor body, and an inverter for controlling a rotational speed of the motor, and a control device for controlling the inverters. Discharge pipes of the compressor bodies converge on one main discharge pipe. A drive frequency of the motor of each compressor body is controlled by the corresponding inverter, whereby a pressure of each discharge pipe is controlled and a discharge pressure of the main discharge pipe is controlled. When the discharge pressure of the main discharge pipe has increased in a period of reduction in the drive frequency of the motor of the compressor body before the drive frequency reaches a lower-limit frequency, the control device calculates a prediction time for reaching a stopping pressure. The control device stops one of the compressor bodies when the prediction time is less than a threshold value.

18 Claims, 7 Drawing Sheets

(56) References Cited

FOREIGN PATENT DOCUMENTS

| | | | |
|---|---|---|---|
| JP | 4-32903 A | | 2/1992 |
| JP | 6-249153 A | | 9/1994 |
| JP | 2002-122078 A | | 4/2002 |
| JP | 2005-337204 A | | 12/2005 |
| JP | 2014-152698 A | | 8/2014 |
| JP | 2014-152699 A | | 8/2014 |
| JP | 2014152698 A | * | 8/2014 |

OTHER PUBLICATIONS

Japanese-language Office Action issued in Japanese Application No. 2020-548071 dated Jun. 1, 2021 (2 pages).
International Search Report (PCT/ISA/210) issued in PCT Application No. PCT/JP2019/029511 dated Oct. 15, 2019 with English translation (two (2) pages).
Japanese-language Written Opinion (PCT/ISA/237) issued in PCT Application No. PCT/JP2019/029511 dated Oct. 15, 2019 (four (4) pages).
Hindi-language Office Action issued in Indian Application No. 202017039181 dated Apr. 28, 2021 with English translation (6 pages).
Japanese-language Office Action issued in Japanese Application No. 2020-548071 dated Oct. 5, 2021 with English translation (seven (7) pages).
Extended European Search Report issued in European Application No. 19868014.2 dated Sep. 28, 2022 (eight (8) pages).

* cited by examiner

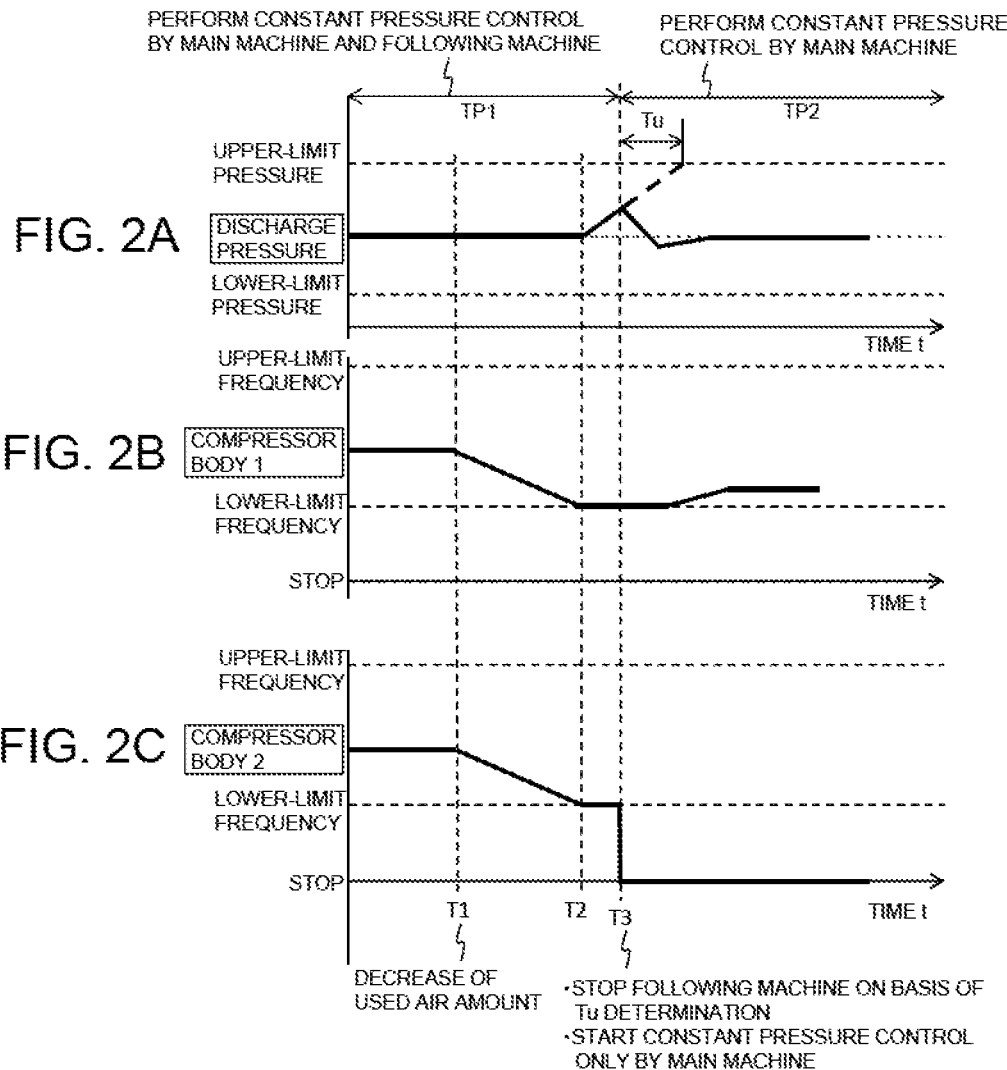

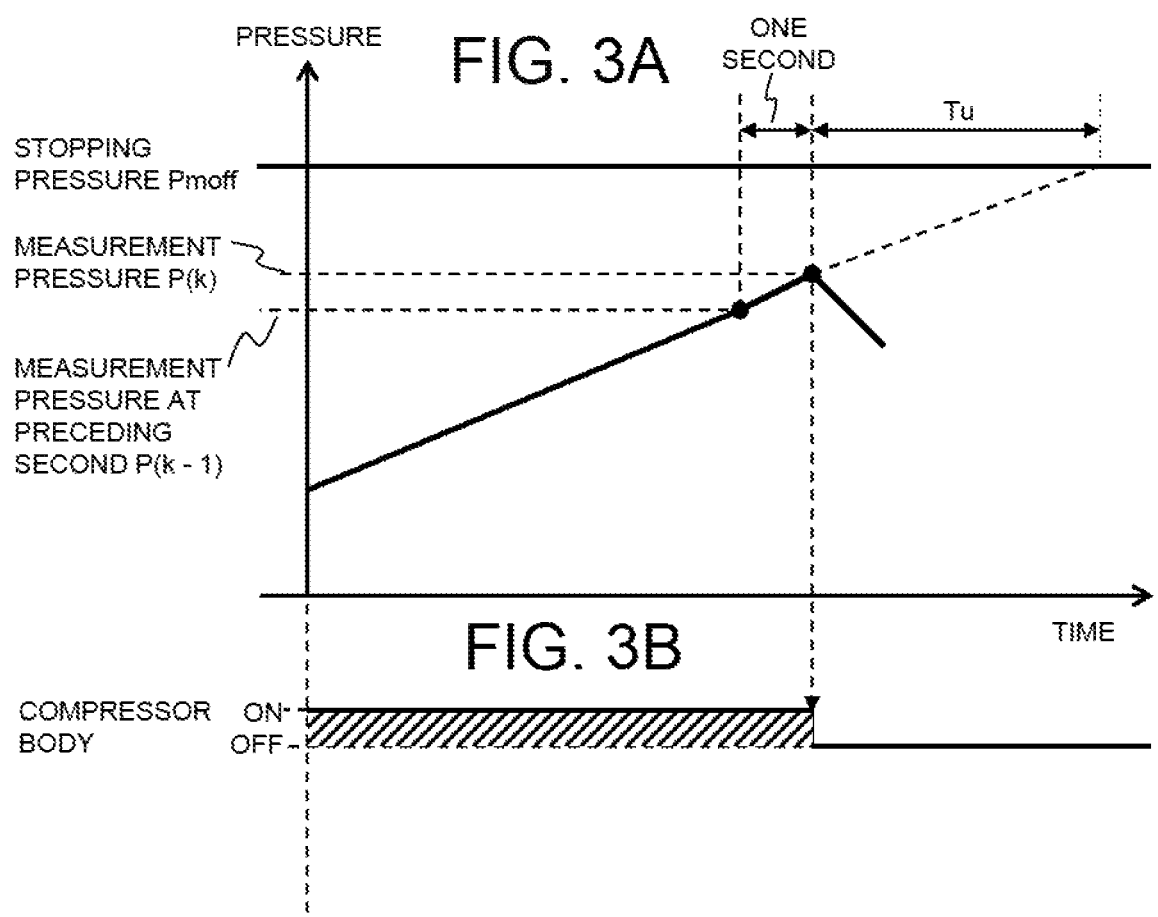

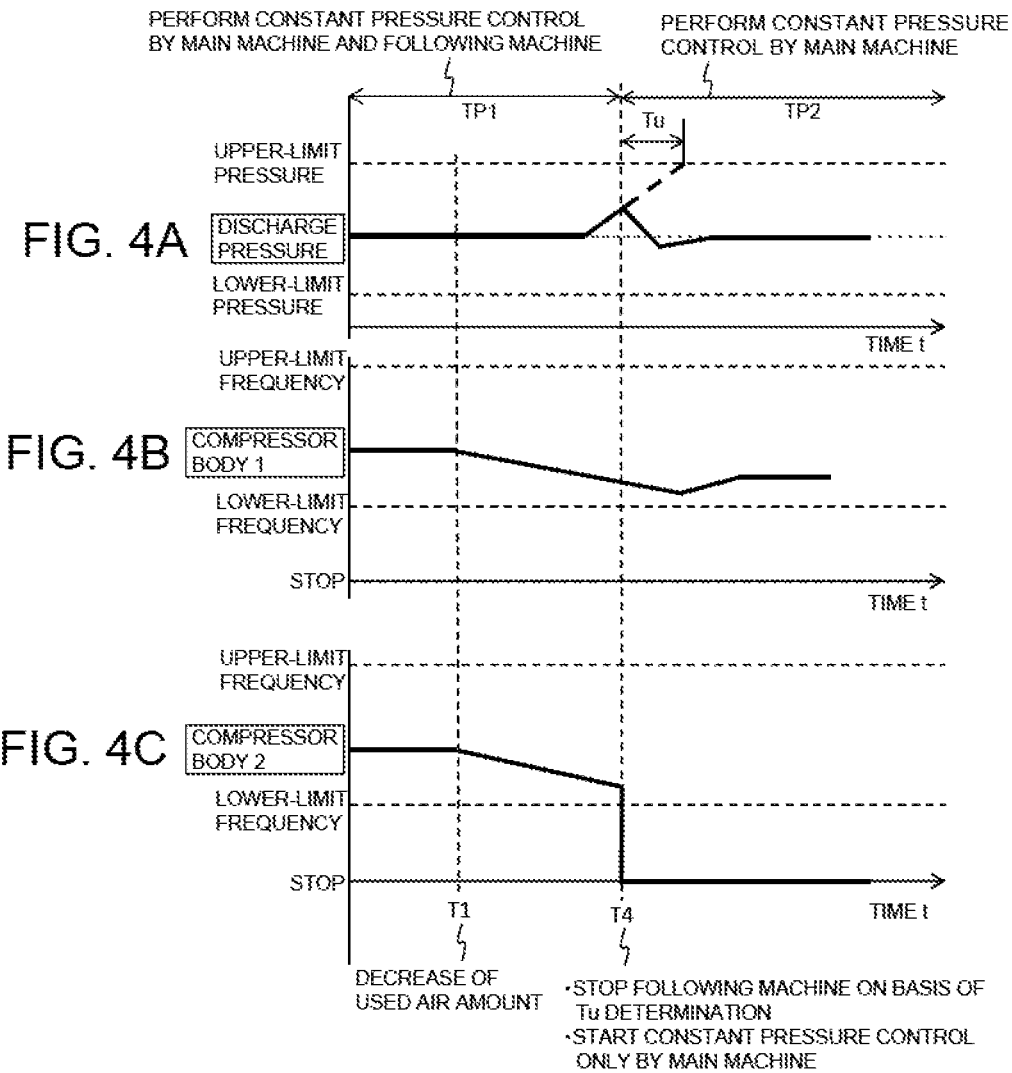

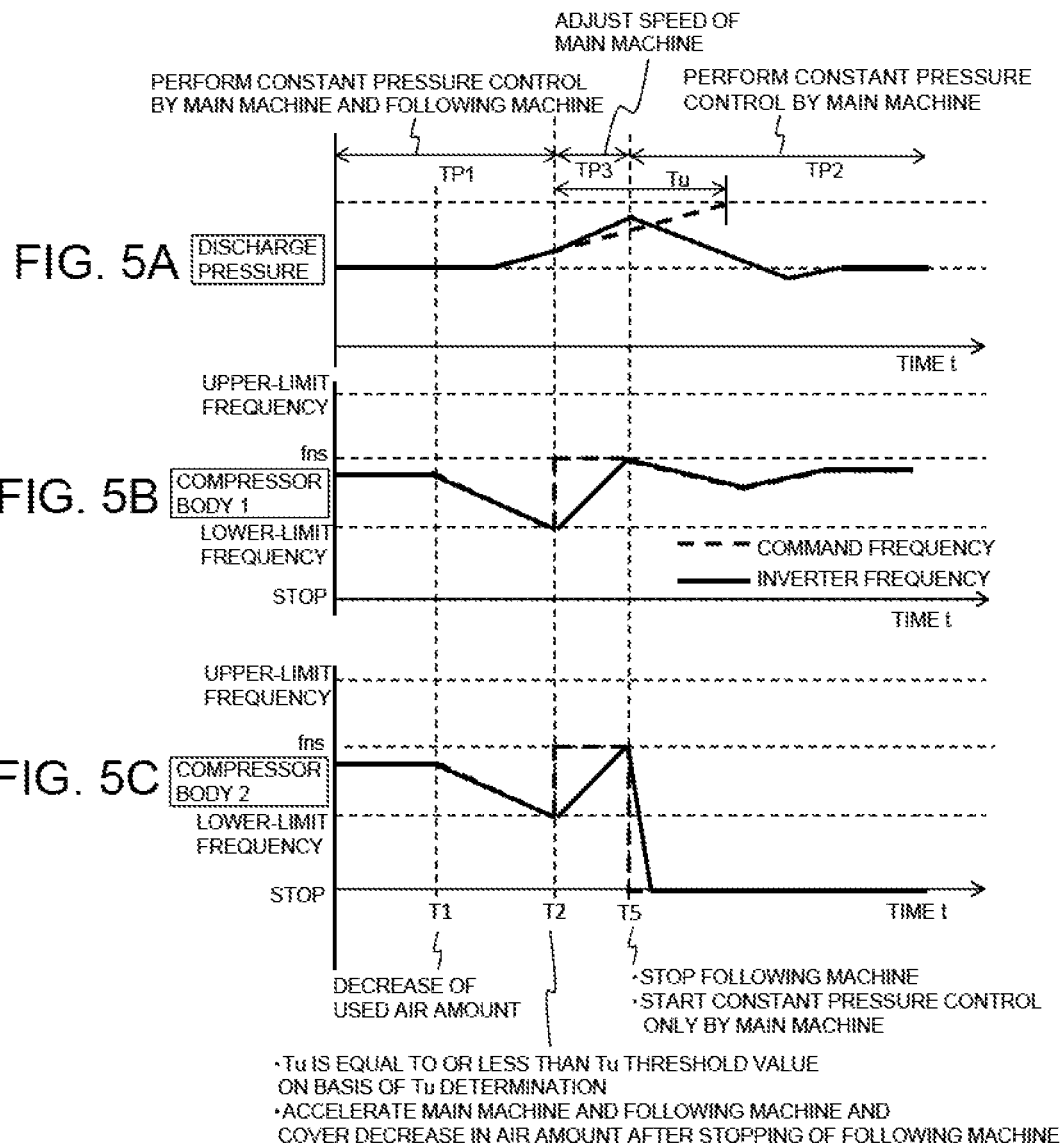

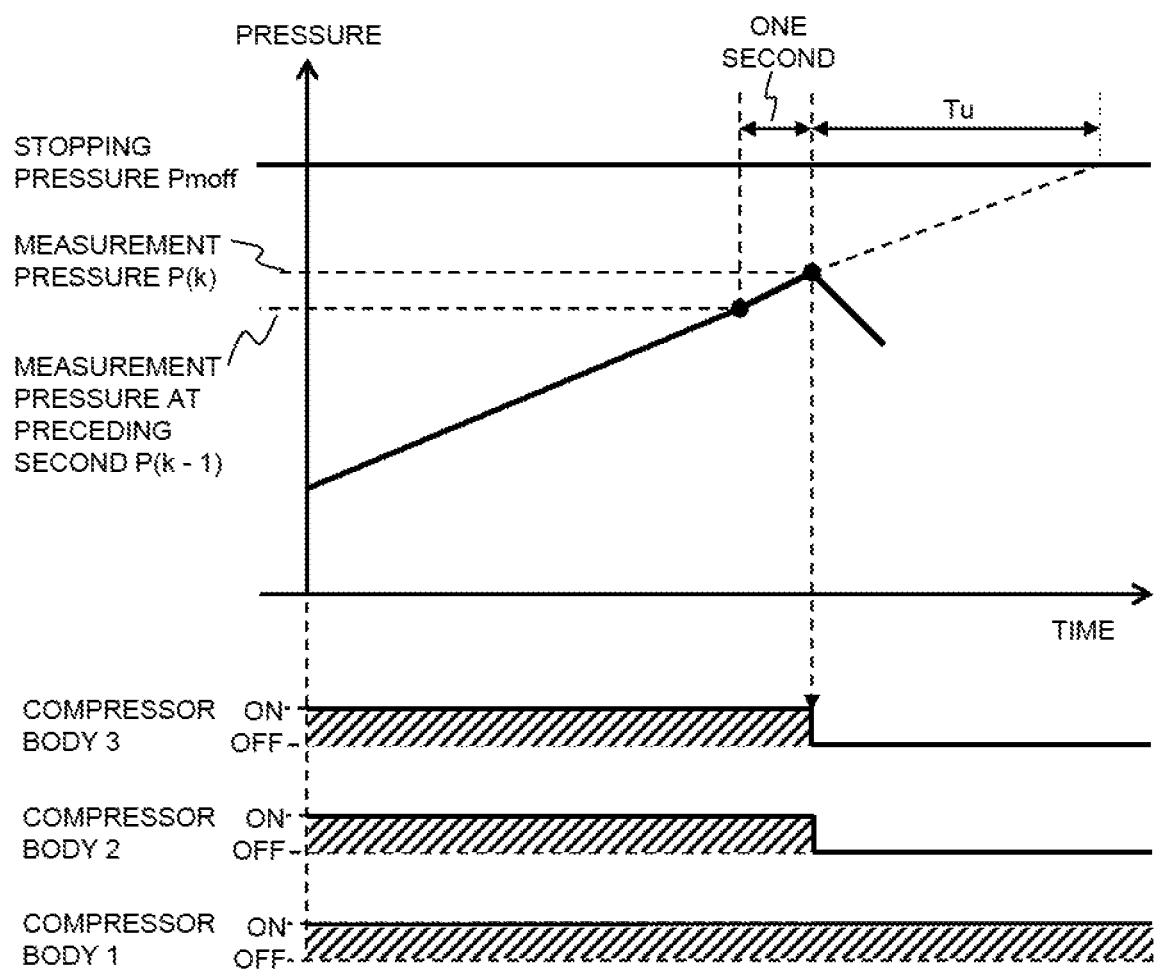

GAS COMPRESSOR AND CONTROL METHOD THEREFOR

TECHNICAL FIELD

The present invention relates to a gas compressor. More particularly, the present invention relates to a method for controlling a gas compressor including a plurality of compressor bodies.

BACKGROUND ART

Patent Document 1 is a background art of a method for controlling a compressor including a plurality of compressor bodies. According to Patent Document 1, the compressor includes the plurality of compressor bodies disposed in parallel and subjected to rotational speed control by an inverter and one main discharge flow path where the discharge flow paths of the compressor bodies converge. According to the compressor operation method described in Patent Document 1 for controlling the discharge pressure in the main discharge flow path to be kept constant, the rotational speed control is equally performed at all times with respect to every operating compressor body for discharge pressure adjustment. In addition, the operating compressor bodies are decreased in number when compressed gas supply to the main discharge flow path is excessive and it is enough to decrease the operating compressor bodies by one in number. The number is increased by one when the compressed gas supply is insufficient even after full-load operation of the operating compressor bodies.

CITATION LIST

Patent Document

Patent Document 1: JP 2002-122078 A

SUMMARY OF THE INVENTION

Problems to be Solved by the Invention

In Patent Document 1, the discharge pressure of the compressor is controlled by the inverter-based rotational speed control. When the operating compressor bodies are N in number, the amount of used air decreases and a command rotational speed SO with respect to the inverter decreases. When SO reaches the value that is obtained by a rated rotational speed SR of a motor being multiplied by $(N-1)/N$, the number N is controlled to be reduced to the number $(N-1)$. However, Patent Document 1 does not consider the problems in the case of a sharp decrease in the amount of used air that the discharge pressure of the compressor rises more than necessary and exceeds an upper-limit pressure without the inverter-based rotational speed control being in time.

The present invention has been made in view of the problems, and an object of the present invention is to provide a gas compressor capable of reducing variation in discharge pressure through control of the number of compressor bodies and a control method for the gas compressor.

Solutions to Problems

The present invention is in view of the background art and problems described above. In one example of the present invention, a gas compressor includes a plurality of compressor units each having a compressor body, a motor for driving the compressor body, and an inverter for controlling a rotational speed of the motor, and a control device for controlling the inverters. Discharge pipes of the compressor bodies converge on one main discharge pipe. A drive frequency of the motor of each compressor body is controlled by the corresponding inverter, whereby a pressure of each discharge pipe is controlled and a discharge pressure of the main discharge pipe is controlled. When the discharge pressure of the main discharge pipe has increased in a period of reduction in the drive frequency of the motor of the compressor body before the drive frequency reaches a lower-limit frequency, the control device calculates a prediction time for reaching a stopping pressure. The control device stops one of the compressor bodies when the prediction time is less than a threshold value.

Effects of the Invention

According to the present invention, it is possible to provide a gas compressor capable of reducing variation in discharge pressure through control of the number of compressor bodies and a control method for the gas compressor.

BRIEF DESCRIPTION OF THE DRAWINGS

FIGS. 2A to 2C are diagrams for describing the number decrease control that is a premise of Example 1.

FIGS. 3A and 3B are diagrams for describing the principle of stopping a compressor body by the pressure prediction control that is a premise of Example 1.

FIGS. 4A to 4C are diagrams for describing the number decrease control in Example 1.

FIGS. 5A to 5C are diagrams for describing the number decrease control in Example 2.

FIG. 6 is a diagram for describing the number decrease control in Example 3.

MODE FOR CARRYING OUT THE INVENTION

Hereinafter, examples of the present invention will be described with reference to the drawings.

Example 1

The gas compressor in this example is premised on a gas compressor equipped with a plurality of compressor bodies. In addition, in this example, a gas compressor that compresses air will be described as an example.

Figure 1:
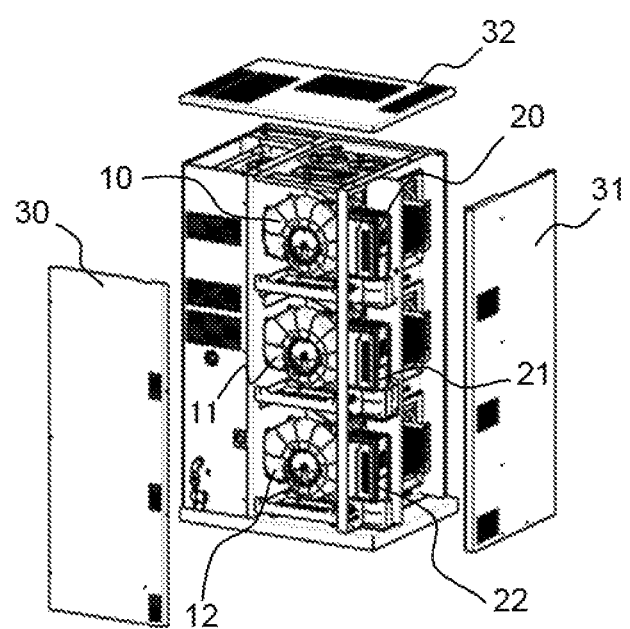
FIG. 1 is a rear perspective view of a gas compressor in Example 1.

FIG. 1 is a rear perspective view of the gas compressor in this example. FIG. 1 illustrates a state where a back panel 30, a side panel 31, and a top panel 32 are removed. As illustrated in FIG. 1, in this example, the gas compressor includes three stages of compressor units. The compressor units include compressor bodies 10, 11, and 12 and inverters 20, 21, and 22, respectively. In addition, the drive frequencies of the motors (hidden and invisible in the drawing) that respectively drive the compressor bodies 10, 11, and 12 are controlled by the inverters 20, 21, and 22, respectively. In addition, a control device (hidden and invisible in the drawing) controlling each inverter is provided. In addition, the discharge pipes of the compressor bodies converge on one main discharge pipe. By the drive frequency of the motor of each compressor body being controlled by the corresponding inverter and the rotational speed of the motor being controlled, the pressure of the discharge pipe is controlled and the discharge pressure of the main discharge pipe is controlled. In other words, the control device controls the discharge pressure of the entire gas compressor by performing inverter-based rotational speed control on the discharge pressure of each compressor body. For example, three 7.5 KW compressor bodies can be used with respect to a gas compressor output of 22 KW.

FIG. 2 is a diagram for describing the number decrease control that is a premise of this example. FIG. 2 is processing of decreasing the number of operating compressor bodies when the amount of used air is decreased and the amount of air is excessive even after a decrease in operating frequency. In FIG. 2, (a) illustrates the discharge pressure of the gas compressor over time (hereinafter, the discharge pressure of the gas compressor, that is, the discharge pressure in the main discharge pipe will be simply referred to as the discharge pressure unless otherwise specified) and (b) and (c) illustrate the drive frequencies of the motors of compressor bodies 1 and 2 (hereinafter, referred to as the drive frequencies of the compressor bodies) over time. Assumed when the compressor body 1 in FIG. 2 is a main machine and the compressor body 2 in FIG. 2 is a following machine is a case where the discharge pressure of the gas compressor is controlled to become constant by PID control in a period TP1 by the inverter-based rotational speed control in the two (main and following) machines. Here, when the used air amount decreases at time T1, the drive frequency of the compressor body is controlled to be lowered by the inverter-based rotational speed control. Then, when a lower-limit frequency is reached at time T2, the frequency cannot be further lowered, and thus the discharge pressure rises. There, a determination is made to decrease the number of operating compressor bodies.

FIG. 3 is a diagram for describing the principle of stopping the compressor body by the pressure prediction control that is a premise of this example. In FIG. 3, (a) illustrates the discharge pressure of the gas compressor over time and (b) illustrates the operation/stop of the compressor body. When the pressure rises in (a), a prediction time Tu for reaching a stopping pressure (upper-limit pressure) is calculated by the following Equation (1). In other words, calculation is performed by means of the inclination information on the straight line of the increasing discharge pressure.

$$Tu=(P_{moff}-P(k))/(P(k)-P(k-1))\times 1 \text{ second} \qquad (1)$$

Here, P(k): measurement pressure, P(k−1): measurement pressure at preceding second, $P_{moff}$: stopping pressure Then, when a Tu threshold value exceeds Tu, it is determined that the rate of decrease in the amount of used air is high and one compressor body is stopped.

At time T3 in FIG. 2, the compressor body 2 (following machine) is stopped by the Tu determination, that is, the pressure prediction control and constant pressure control is started only by the main machine.

Assumed here is a case where the discharge pressure of the compressor rises more than necessary and exceeds the upper-limit pressure without the inverter-based rotational speed control being in time in the case of a sharp decrease in the amount of used air.

In this regard, in this example, the Tu prediction determination is made when the discharge pressure has risen while the drive frequency of the compressor body decreases before reaching the lower-limit frequency.

FIG. 4 is a diagram for describing the number decrease control in this example. The conditions in FIG. 4 are the same as those in FIG. 2. FIG. 4 differs from FIG. 2 in that the Tu determination is made at time T4 when the discharge pressure has risen while the drive frequencies of the compressor bodies 1 and 2 decrease before reaching the lower-limit frequency and the compressor body 2 is stopped when the Tu threshold value exceeds Tu in (b) and (c) of FIG. 4. As a result, a rise in pressure can be suppressed early and it is possible to prevent the discharge pressure from rising due to a sharp decrease in the amount of used air.

Example 2

Reducing variation in discharge pressure by performing operation for an increase in pressure before stopping the following machine will be described in this example.

FIG. 5 is a diagram for describing the number decrease control in this example. The conditions in FIG. 5 are the same as those in FIG. 2. FIG. 5 differs from FIG. 2 in that the Tu determination is made when the discharge pressure has risen during operation at the lower-limit frequency and, when the Tu threshold value exceeds Tu, the compressor body 2 (following machine) is stopped at time T5 and the constant pressure control is started only by the main machine after the frequency is raised to an operation start frequency fns after one of the compressor bodies 1 and 2 is stopped.

In other words, when the following machine is stopped, the number of operating machines is halved, and thus the pressure decreases until the rotational speed of the main machine is increased. Accordingly, before the following machine is stopped, the main and following machines are accelerated and the pressure is slightly raised to the extent that the pressure is reduced by the following machine being stopped. As a result, it is possible to reduce the variation in discharge pressure that is attributable to the number decrease control.

It should be noted that the Tu determination may be made at time T3 that is subsequent to time T2 as in FIG. 2 although time T2 at which the lower-limit frequency is reached and time T3 at which the Tu determination is made are the same in the description of this example.

Example 3

An example in which it is possible to stop a plurality of units when a sudden rise in pressure occurs during operation of three or more units will be described in this example.

FIG. 6 is a diagram for describing the number decrease control in this example. A case where three compressor bodies operate is illustrated as an example in FIG. 6. In the description of FIG. 3, the prediction time Tu for reaching the stopping pressure (upper-limit pressure) is calculated by the above Equation (1) when the discharge pressure rises and it is determined that the rate of decrease in the amount of used air is high and a determination is made to stop the compressor body when the predetermined threshold value exceeds Tu. On the other hand, in this example, two Tu threshold values (Tu1 and Tu2 exceeding Tu1) are provided and control is performed such that one compressor body (compressor body 3) is stopped in the case of Tu1≤Tu<Tu2 and two compressor bodies (compressor bodies 2 and 3) are stopped in the case of Tu<Tu1. As a result, it is possible to quickly reduce variation in pressure even in the event of a sharp rise in pressure.

It should be noted that this example is not limited to the three units. A plurality of Tu threshold values may be provided and a plurality of units may be simultaneously stopped in the case of three or more units.

Example 4

An example of control in accordance with the lower-limit frequency of the compressor body will be described in this example. In the description of this example, a rotational frequency will be expressed as a percentage with the upper-limit frequency of the compressor body at 100% and the amount of use of compressed air will be expressed as a percentage with the amount of compressed air discharged by one compressor body operating at the upper-limit frequency at 100%.

The lower-limit frequency of the motor of the compressor body in this example is, for example, 60%. This is because the motor is provided with a compressor cooling fan and thus a low rotational frequency results in a decrease in the rotational speed of the cooling fan and no sufficient cooling of the compressor and a decline in compression efficiency arises from air leakage from a compression chamber and recompression in a region where the rotational frequency is low.

Figure 7A:
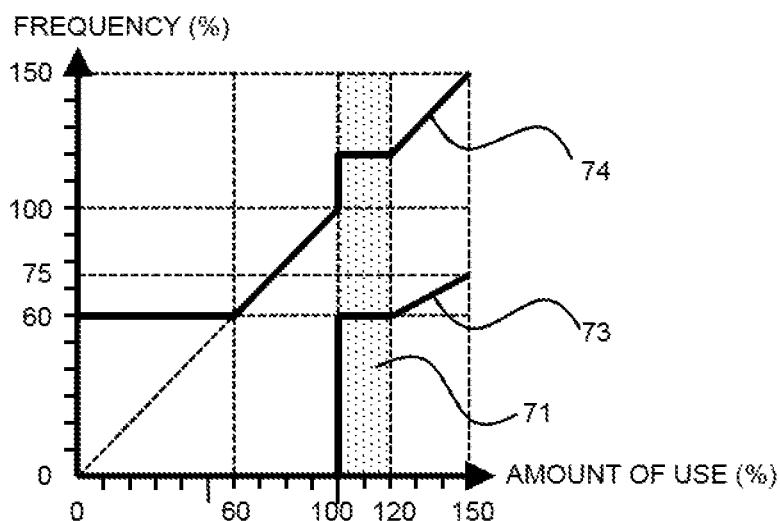
FIGS. 7A to 7C are graphs for describing the relationship between the amount of use of compressed air and the rotational frequency of a compressor in Example 4.
Figure 7B:
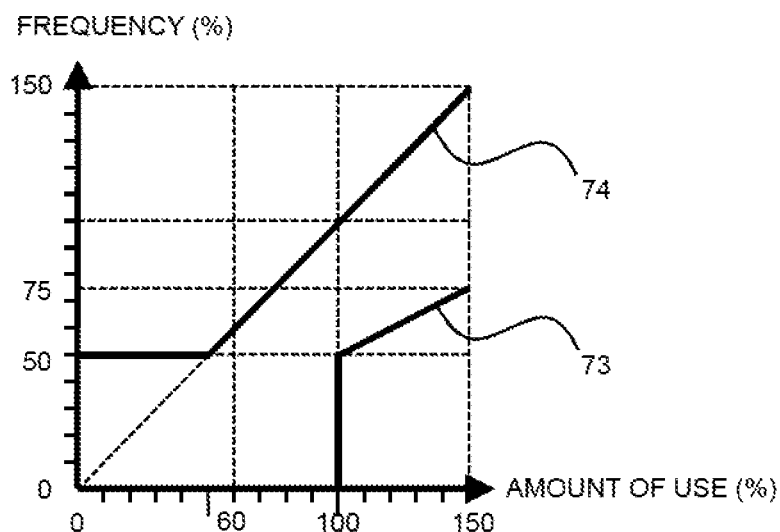
Figure 7C:
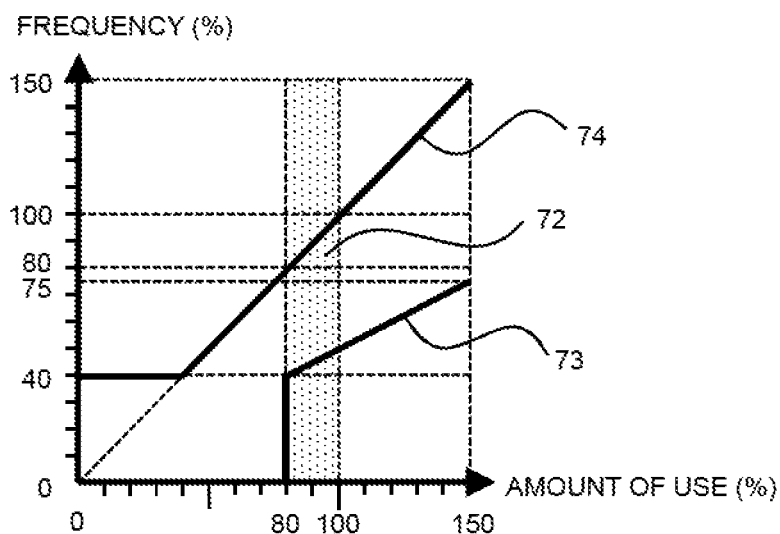

FIG. 7 shows an example of the relationship between the amount of use of compressed air and the number of activated compressor bodies and the rotational frequencies thereof. FIG. 7(a) is a graph showing the operation at a time when the lower-limit frequency of the compressor is 60%. FIG. 7(b) is a graph showing the operation at a time when operation is possible with the lower-limit frequency at 50%. FIG. 7(c) is a graph showing the operation at a time when operation is possible with the lower-limit frequency at 40%. It should be noted that operation is possible at a lower-limit frequency of less than 60% even in the regions of 50% to 60% and 40% to 60% in FIGS. 7(b) and 7(c) and yet the lower-limit frequency may be 60% as in FIG. 7(a) in this region.

In FIG. 7, 74 is a graph showing the relationship between the rotational frequency of the entire compressor body and the compressed air generation amount that corresponds thereto (=the amount of compressed air used by a customer). In addition, 73 is a graph showing the relationship between the rotational frequency of the second compressor body and the compressed air generation amount that corresponds thereto (=the amount of compressed air used by the customer).

In other words, in the graph 74 in which the amount of use is 0% to 100% in FIG. 7(a), only the first compressor body operates, and thus the graph 74 in this region is equivalent to the graph that shows the relationship between the rotational frequency of the first compressor body and the compressed air generation amount corresponding thereto (=the amount of compressed air used by the customer) and the part obtained by the graph 73 being subtracted from the graph 74 in which the amount of use is 100% or more shows the relationship between the rotational frequency of the first compressor body and the compressed air generation amount corresponding thereto.

When the lower-limit frequency is set to 60%, a first state where one compressor body operates at an output of 100% and a second state where two compressor bodies each operate at an output of 60% are alternately performed in a region 71 where the amount of use of compressed air is more than 100% and less than 120%. As a result, operation is performed at an output of more than 100% and less than 120% on an hourly average. In this case, the component service life of the second compressor body in particular may be shortened by repeated ON/OFF. In addition, there is a time lag between the activation of the compressor body and target compressed air discharge, and thus the followability of the discharge air amount with respect to the amount of use of compressed air may decline. In this case, replacing the first and second compressors every predetermined time or every time the ON/OFF count exceeds a predetermined count is desirable in order to prevent an extreme decline in the component service life of one compressor body.

The problem of an increase in ON/OFF count can be addressed by means of a low-rotational speed mode that allows the compressor body to operate at a lower-limit frequency of less than 60% only when the used air amount is 100% to 120%. In other words, when the used air amount is more than 100% and less than 120% as shown in FIG. 7(b), one unit operates up to a used air amount of 100% by the compressor body being allowed to operate at a lower-limit frequency of at least 50% and it is possible to reduce the ON/OFF count of the second compressor body by two compressor bodies operating at a frequency of 50% to 60% in the case of more than 100% and less than 120%. However, when the amount of air used by the customer is around 100% with the lower-limit frequency set to 50%, there is a possibility of hunting in which the state of one unit operating at a frequency of 100% and the state of two units operating at a frequency of 50% frequently transition. This may lead to an increase in the ON/OFF count of the second compressor body, and thus it is desirable to be capable of setting a frequency even lower than 50%.

For example, it is possible to cover a region 72 where the amount of use is 80% to 100% with one or two units by the lower-limit frequency being allowed to be set to 40% as shown in FIG. 7(c). By setting being performed in this manner, hysteresis can be given by an increase and a decrease in the number of units and the compressor body can be operated without hunting even when the amount of use is around 100%. In other words, two compressors operate at a frequency of approximately 50% when the amount of use changes near 100%. Then, when the amount of use has decreased to 80%, transition occurs from the state of two compressor bodies operating at 40% to the state of one operating at 80%. Subsequently, one compressor body supplies compressed air until the amount of use reaches 100%. It should be noted that there is a time lag between the activation of the compressor body and the discharge of the compressed air as described above and thus the second compressor body may be activated and the two compressor bodies may operate at a frequency of approximately 50% at a point in time when, for example, the amount of use has reached 95%. The followability with respect to an increase in the amount of use is improved by setting being performed in this manner.

It should be noted that the compression efficiency may decline or the compressor body may be overheated in a situation in which the compressor body with a lower-limit frequency of 60% is operated at a frequency of 40% and thus control for lowering the lower-limit frequency needs to be narrowed down to a case where the hunting is likely to occur. The hunting is likely to occur in a situation in which the amount of air used by the customer continues to be around 100%, that is, the amount of air used by the customer changes little. Accordingly, a threshold value is set for Tu, which is a measure of the rate of change in the amount of air used by the customer, and operation is possible at a lower-limit frequency of less than 60% when Tu does not exceed the threshold value. This determination needs to be made before the second compressor body is stopped, and thus this threshold value is a value exceeding the Tu threshold value described in Example 1.

In addition, in the low-rotational speed mode, control for forcible cooling may be performed by increasing the rotational speed of the fan by allowing time to increase the rotation speed at regular time intervals. In addition, control may be performed such that the low-rotational speed mode is released when the body temperature has become a predetermined temperature or more. It is possible to prevent the compressor body from being heated by limiting the low-rotational speed mode in this manner.

It should be noted that the low-rotational speed mode is applied when the amount of use is around 100% at which the number of operating compressor bodies is switched between one and two. When the amount of use is around 200% at which two and three units are switched, 100%×2 units (200%) already exceeds 60%×3 units (180%) and the operating ranges of the two units and the operating ranges of the three units overlap, and thus the low-rotational speed mode is unnecessary. In other words, this is because there is no region corresponding to the region 71 incapable of following the amount of use of compressed air as in FIG. 7(a). However, hunting prevention control is applicable by hysteresis being given with an increase and a decrease in the number of units as described above and this is effective for improving the component service life of the compressor body.

It should be noted that control in using the compressor body with the lower-limit frequency set to 60% has been described in this example and yet this control can be similarly performed insofar as the compressor body has a lower-limit frequency of 50% or more. In addition, although the numerical value such as setting the lower-limit frequency in the low-rotational speed mode to 40% and activating the second unit at a point in time when the amount of use reaches 95% during the operation of one unit is not ineffective unless it is exactly this value, the value is capable of strongly exhibiting the effect of each configuration in this example by control near this numerical value in general.

Although examples have been described above, the present invention is not limited to the examples and includes various modification examples. For example, the examples have been described in detail so that the present invention is described in an easy-to-understand manner and are not necessarily limited to those having all the described configurations. In addition, it is possible to replace a part of the configuration of one example with the configuration of another example and to add the configuration of another example to the configuration of one example. In addition, another configuration can be added, deleted, and replaced with respect to a part of the configuration of each example.

REFERENCE SIGNS LIST 10, 11, 12 Compressor body
20, 21, 22 Inverter
30 Back panel
31 Side panel
32 Top panel

The invention claimed is:

1. A gas compressor comprising:
a plurality of compressor units each including a compressor body, a motor for driving the compressor body, and an inverter for controlling the motor;
a control device for controlling the inverters; and
one main discharge pipe where discharge pipes of the compressor bodies converge, wherein
the motor of each compressor body is controlled by the corresponding inverter, whereby a pressure of each discharge pipe is controlled and a discharge pressure of the main discharge pipe is controlled,
a lower-limit frequency of the motor is different when the number of operating compressor units increases with the increase in the amount of compressed gas used from the main discharge pipe and when the operating number of compressor units decreases with the decrease in the amount of compressed gas used from the main discharge pipe, and
when the operating number of compressor units decreases, a drive frequency of compressor units that continue to be operated is controlled to have a constant value.

2. The gas compressor according to claim 1,
wherein the lower-limit frequency is lower when the number of operating compressor units decreases as the usage decreases.

3. The gas compressor according to claim 2,
when the discharge pressure of the main discharge pipe has increased in a period of reduction in the drive frequency of the motor of the compressor body before the drive frequency reaches a lower-limit frequency, the control device calculates a prediction time for reaching a stopping pressure, and
the control device stops one of the compressor bodies when the prediction time is less than a threshold value.

4. The gas compressor according to claim 3,
wherein the calculation of the prediction time for reaching the stopping pressure is predicted by means of inclination information on a straight line of the increasing discharge pressure of the main discharge pipe.

5. The gas compressor according to claim 2,
when the discharge pressure of the main discharge pipe has increased in an operating state where the drive frequency of the motor of the compressor body is the lower-limit frequency, the control device calculates a prediction time for reaching a stopping pressure, and
the control device stops one of the compressor bodies after raising the drive frequency of the motor of the compressor body when the prediction time is less than a threshold value.

6. The gas compressor according to claim 5,
wherein the rise in the drive frequency of the motor of the compressor body is raised to an operation start frequency after the stopping of one of the compressor bodies.

7. The gas compressor according to claim 3,
wherein the compressor units are three or more in number,
the threshold value has a first threshold value and a second threshold value greater than the first threshold value,
one of the compressor bodies is stopped when the prediction time is greater than the first threshold value and less than the second threshold value, and
two of the compressor bodies are stopped when the prediction time is less than the first threshold value.

8. The gas compressor according to claim 3,
wherein the lower-limit frequency of the compressor body is lowered when one of the compressor bodies is stopped and the number of operating compressor bodies is decreased from two to one.

9. The gas compressor according to claim 8,
wherein a difference in the amount of compressed gas covered by one compressor body is provided when the operating compressor bodies are increased in number and when the operating compressor bodies are decreased in number.

10. A method for controlling a gas compressor including a plurality of compressor units each having a compressor body, a motor for driving the compressor body, and an inverter for controlling the motor, a control device for controlling the inverters, one main discharge pipe where discharge pipes of the compressor bodies converge, and the motor of each compressor body is controlled by the corresponding inverter, whereby a pressure of each discharge pipe is controlled and a discharge pressure of the main discharge pipe is controlled, wherein
a lower-limit frequency of the motor is different when the number of operating compressor units increases with the increase in the amount of compressed gas used from the main discharge pipe and when the operating number of compressor units decreases with the decrease in the amount of compressed gas used from the main discharge pipe, and
when the operating number of compressor units decreases, a drive frequency of compressor units that continue to be operated is controlled to have a constant value.

11. The gas compressor control method according to claim 10,
wherein the lower-limit frequency is lower when the number of operating compressor units decreases as the usage decreases.

12. The gas compressor control method according to claim 11,
wherein a prediction time for reaching a stopping pressure is calculated when the discharge pressure of the main discharge pipe has increased in a period of reduction in the drive frequency of the motor of the compressor body before the drive frequency reaches the lower-limit frequency, and
one of the compressor bodies is stopped when the prediction time is less than a threshold value.

13. The gas compressor control method according to claim 12,
wherein the calculation of the prediction time for reaching the stopping pressure is predicted by means of inclination information on a straight line of the increasing discharge pressure of the main discharge pipe.

14. The gas compressor control method according to claim 11,
wherein a prediction time for reaching a stopping pressure is calculated when the discharge pressure of the main discharge pipe has increased in an operating state where the drive frequency of the motor of the compressor body is a lower-limit frequency, and
one of the compressor bodies is stopped after the drive frequency of the motor of the compressor body is raised when the prediction time is less than a threshold value.

15. The gas compressor control method according to claim 14,
wherein the rise in the drive frequency of the motor of the compressor body is raised to an operation start frequency after the stopping of one of the compressor bodies.

16. The gas compressor control method according to claim 12,
wherein the compressor units are three or more in number,
the threshold value has a first threshold value and a second threshold value greater than the first threshold value,
one of the compressor bodies is stopped when the prediction time is greater than the first threshold value and less than the second threshold value, and
two of the compressor bodies are stopped when the prediction time is less than the first threshold value.

17. The gas compressor control method according to claim 12,
wherein the lower-limit frequency of the compressor body is lowered when one of the compressor bodies is stopped and the number of operating compressor bodies is decreased from two to one.

18. The gas compressor control method according to claim 17,
wherein a difference in the amount of compressed gas covered by one compressor body is provided when the operating compressor bodies are increased in number and when the operating compressor bodies are decreased in number.

* * * * *